UNITED STATES PATENT OFFICE.

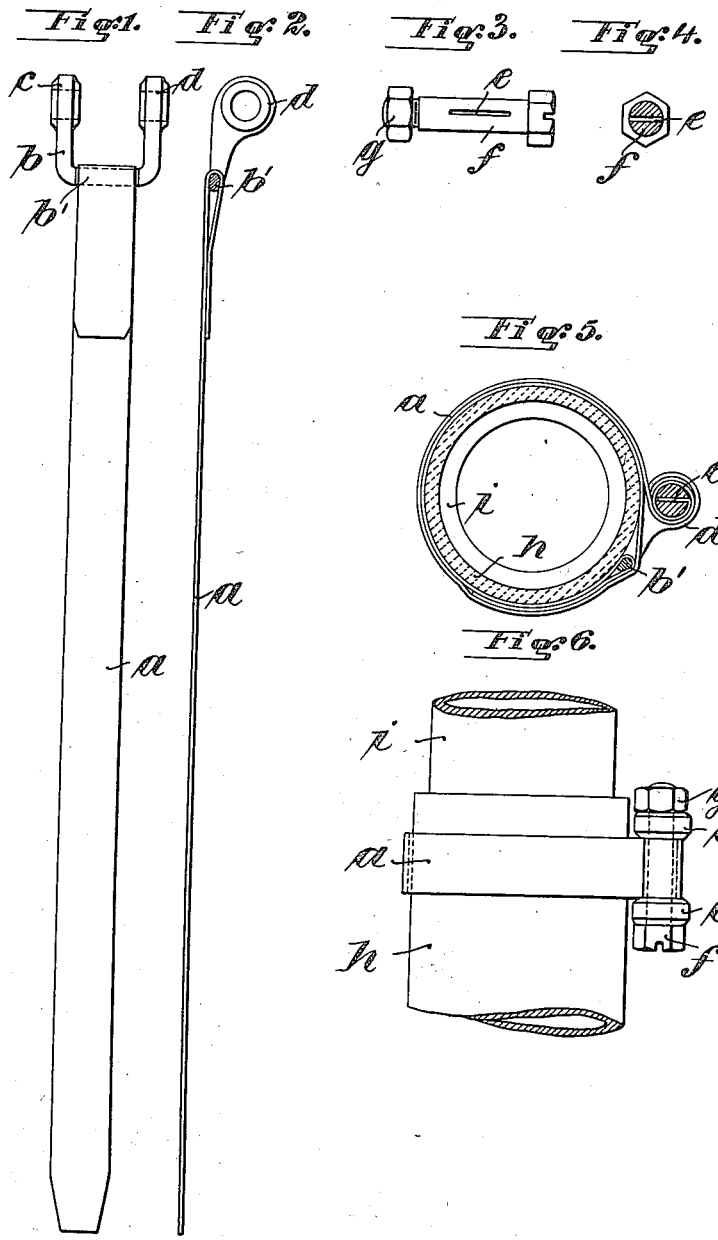

FRITZ NEPPACH, OF STUTTGART-CANNSTATT, GERMANY.

CLAMP.

1,173,455.

Specification of Letters Patent.  Patented Feb. 29, 1916.

Application filed February 12, 1915. Serial No. 7,854.

*To all whom it may concern:*

Be it known that I, FRITZ NEPPACH, a subject of the German Emperor, and resident of Stuttgart-Cannstatt, Germany, have invented certain new and useful Improvements in Clamps, of which the following is a specification.

My invention relates to a novel clamp for keeping an object having a plurality of parts in compressed or assembled condition, or for fastening a hollow body of yielding material, for instance a hose, upon a rigid body, for instance a metal pipe, and more particularly in such a manner that a close fit will be secured between said two bodies.

The device of my invention is especially designed to meet the demand for a proper device of this latter class, which is independent from the diameter of the parts to be joined and which may therefore be conveniently used for hose-connections of the various diameters found in practice.

The clamp of my present invention is especially well suited for the purpose of making hose and pipe connections in all kinds of engines, apparatus for compressed air or steam, automobiles and so forth, wherein a great number of different diameters are existing.

Regarding the first-mentioned purpose it may be remarked that I regard the device of my invention particularly advantageous for work with pieces composed of a plurality of parts which must be kept properly assembled during the working process. For applying the clamp it is immaterial whether the cross-section of such working piece is round, oval or of other form, or whether the cross-section is of different form on different places.

For the purpose of convenient adjustment the device of my present invention comprises as an essential element a ribbon, band or tape, preferably of metal, which can easily be made of greater or smaller length to fit any existing size or diameter of the members to be joined.

My invention will be more fully understood by reference to the accompanying drawings, of which—

Figure 1 is a front view showing a hinge with eyes for the reception of a bolt and a tape which is fastened to said hinge by being merely laid around the same, Fig. 2 a side view to Fig. 1, Fig. 3 a front view of the aforementioned bolt, Fig. 4 a side view thereof and Figs. 5 and 6 illustrate the application of the clamp for fastening a hose upon a pipe of round cross-section, the former figure being a section and the latter a view of the pipe and hose connection.

Referring now more particularly to the drawing the clamp consists of four individual parts, viz: the tape $a$, the U-shaped hinge $b$ which is provided at the outer ends of its shanks with openings or eyes $c$ and $d$ serving for the reception of the screw bolt $f$ having a slot $e$, and the nut $g$ which may be threaded upon said bolt for locking the same in position. The tape or strap $a$ is doubled over the cross bar of member $b$, and is held thereto by frictional contact, so that any eyes, slits or other mutilations of the strap are entirely obviated, while the strap may furthermore be secured to said member at each point of its length.

The bolt $f$ is rotatably mounted in the eyes $c$ and $d$, and may be locked in position by the nut $g$ which when drawn tight will firmly unite the bolt with the hinge $b$ and therewith also keep the tape $a$ which is laid around the hose to be fastened in stretched condition. The clamp is applied to the hose and pipe as shown in Figs. 5 and 6 in such a manner that the ribbon $a$ is wound in a single turn or in several turns one above the other around the hose, passed through the space between the hinge $b$ and the bolt $f$ and then inserted into the slot $e$ which is provided in said bolt. By rotation of the bolt $f$ the ribbon $a$ will be wound up around the same and thus be drawn tight around the hose $h$, thereby pressing the latter upon the end of the pipe $i$, whereupon the nut $g$ is drawn tight and the bolt locked in position.

A hose which is fastened upon a pipe end in the afore-mentioned manner will be firmly joined with the same to practically form a mechanical unit therewith and will be able to withstand any reasonable force tending to separate the same.

Having thus described my invention I claim as new and desire to secure by Letters Patent of the United States:—

A clamp comprising a U-shaped member, having eyed shanks; a strap doubled at one of its ends over the cross bar of said member, a screw bolt engaging the eyed shanks, and having a longitudinal slot adapted to be engaged by the other end of said strap, and a locking nut fitted upon the bolt.

In testimony whereof I have hereunto set my signature in the presence of two subscribing witnesses.

FRITZ NEPPACH.

Witnesses:
 ERNEST ENTENMANN,
 FRIEDA FLAIBER.